US012810034B1

(12) United States Patent
Schultz et al.

(10) Patent No.: US 12,810,034 B1
(45) Date of Patent: Nov. 24, 2026

(54) GLOBAL DEVICE RESOURCE DISABLE

(71) Applicant: XILINX, INC., San Jose, CA (US)

(72) Inventors: David P. Schultz, Longmont, CO (US); Ahmad R. Ansari, San Jose, CA (US)

(73) Assignee: XILINX, INC., San Jose, CA (US)

( * ) Notice: Subject to any disclaimer, the term of this patent is extended or adjusted under 35 U.S.C. 154(b) by 691 days.

(21) Appl. No.: 17/243,261

(22) Filed: Apr. 28, 2021

(51) Int. Cl.
*G06F 21/79* (2013.01)
*G06F 9/50* (2006.01)
*G06F 21/57* (2013.01)
*G06F 21/75* (2013.01)
*G06F 21/85* (2013.01)

(52) U.S. Cl.
CPC ............ *G06F 21/79* (2013.01); *G06F 9/5011* (2013.01); *G06F 21/575* (2013.01); *G06F 21/75* (2013.01); *G06F 21/85* (2013.01)

(58) Field of Classification Search
CPC .. G06F 21/78–805; G06F 21/85; G06F 12/14; G06F 12/1458; G06F 12/1466
See application file for complete search history.

(56) References Cited

U.S. PATENT DOCUMENTS 5,874,854 A * 2/1999 Skergan .................. G05F 3/247 327/337
5,964,835 A * 10/1999 Fowler .................... H04L 49/90 709/216
6,160,418 A * 12/2000 Burnham ............. H03K 19/177 326/38
8,332,552 B2 * 12/2012 Arimilli ................ G06F 13/385 710/72
2008/0244108 A1 * 10/2008 Abramson .............. G06F 21/85 710/16
2013/0046967 A1 * 2/2013 Fullerton .................. G06F 1/32 713/100
2016/0224488 A1 * 8/2016 Huang ................ G06F 13/4068
2018/0121274 A1 * 5/2018 Speier .................. G11C 29/832
2022/0129390 A1 * 4/2022 Shiner ................. G06F 12/1433
2023/0237157 A1 * 7/2023 Dower .................... G06F 21/79 726/26

* cited by examiner

*Primary Examiner* — Daniel B Potratz
(74) *Attorney, Agent, or Firm* — Patterson + Sheridan, LLP

(57) ABSTRACT

Examples described herein provide device having a global device resource disable infrastructure. The device generally includes a plurality of resource blocks. The device includes a plurality of disable registers, each disable register coupled to a respective one of the plurality of resource blocks and each disable register is configured to disable at least some functionality of the respective resource block based on received disable data. The device includes a secure global interconnect coupled to a disable controller and to each of the plurality of disable registers. The device includes a disable controller configured to transmit to the disable data to the plurality of registers via the secure global interconnect, wherein the disable data indicates a subset of the plurality of resource blocks to disable.

20 Claims, 4 Drawing Sheets

GLOBAL DEVICE RESOURCE DISABLE

TECHNICAL FIELD

Examples of the present disclosure generally relate to disabling device resources and, in particular, to selectively and permanently disabling global device resources on integrated circuits.

BACKGROUND

An integrated circuit (IC) includes multiple resources, such as digital-to-analog converters (DACs), analog-to-digital converters (ADCs), processing engines, execution units, peripherals, memory, and more. Some of these resources on the IC may need to be restricted for reasons such as cost reduction and export control. Restriction of resources on the IC may be implemented using software. However, restrictions using software may be difficult to enforce and there is a need for hardware techniques that cannot be easily worked around. Accordingly, a different technique for restricting resources on an IC is needed.

SUMMARY

These and other aspects may be understood with reference to the following detailed description. One example is an integrated circuit (IC) having a global infrastructure for disabling device resources. The IC includes a plurality of resource blocks; a plurality of disable registers, each disable register coupled to a respective one of the plurality of resource blocks and each disable register is configured to disable at least some functionality of the respective resource block based on received disable data; a secure global interconnect coupled to a disable controller and to each of the plurality of disable registers; and the disable controller configured to transmit the disable data to the plurality of registers, wherein the disable data indicates a subset of the plurality of resource blocks to disable.

Another example is a method for a device. The method includes receiving, by a plurality of disable registers of the device, from a disable controller of the device, information for disabling a subset of a plurality of resource blocks coupled to the plurality of disable registers; and disabling, by a subset of the plurality of disabled registers, at least some functionality of the corresponding resource block based on the information for disabling a respective resource block.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
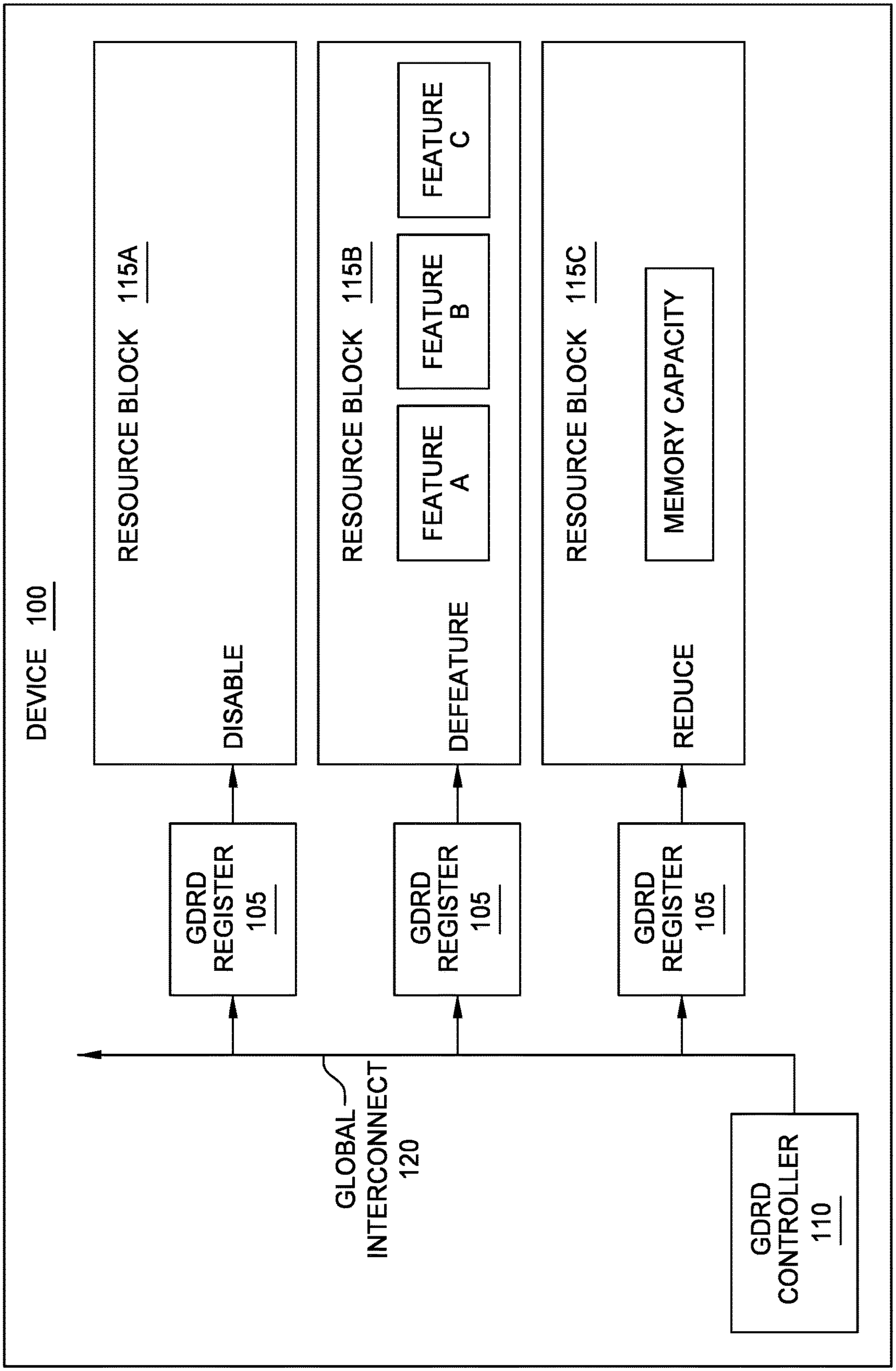
FIG. 1 illustrates a device having a global device resource disable infrastructure, according to one example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the description or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Examples disclosed herein provide techniques for disabling global device resources. In some examples, a global device resource disable (GDRD) infrastructure on device allows for selectively disabling silicon device resources, which is advantageous for silicon derived die devices and export controlled devices. For both silicon derived die devices and export controlled devices, the GDRD infrastructure disables a subset of the device's functionalities, either for cost reduction (in the case of silicon derived die devices) or for limiting resources for export to countries that have government-imposed capability restrictions (in the case of export controlled devices). The GDRD infrastructure can be used to limit device input/output bandwidth by disabling a subset of input/outputs, including transceivers. The GDRD infrastructure can be used to limit logic capacity by disabling fabric regions of a multi-die device. In a device that contains an array of processing engines (e.g., artificial intelligence engines or data processing engines), the GDRD infrastructure can limit capacity by disabling some or all processing engines. The GDRD infrastructure can eliminate device functions, such as ADC, DACs, High-Speed Crypto (HSC) engines, and others by forcing a permanent disable.

In one embodiment, the GDRD infrastructure includes a secure global interconnect to transmit disable data to device resources that are accessible through the secure global interconnect and that need to be disabled. A secure global interconnect does not allow access to the secure global interconnect other than by a controller whose sole function is to distribute disable (or enable) data. While the controller may be triggered by an external entity, such as a microcontroller running firmware, that microcontroller has no means to alter the addressing or data on the secure global interconnect.

The device resources can include resources such as input/output, memory controllers, high-bandwidth memory interfaces, fabric regions, and processing engines. The disable data can be transmitted during an initial boot of the device, and can be stored locally for each block in a secure manner that prevents modification of the disable data during and/or after programming or the initial boot, thereby permanently disabling the corresponding portions of the IC that were intended to be disabled.

FIG. 1 is a block diagram of a device 100 having the GDRD infrastructure, according to one example. The device 100 comprises a GDRD controller 110, a secure global interconnect 120, GDRD registers 105 (hereinafter referred individually as GDRD register 105 or collectively as GDRD registers 105), and resource blocks 115A-C (hereinafter referred individually as resource block 115 or collectively as resource blocks 115). The GDRD controller 110 is coupled to each of the GDRD registers 105 via the secure global interconnect 120. The GDRD registers 105 in turn are coupled to the resource blocks 115. In some examples, the device 100 can be a single integrated circuit (IC) or a multi-die device Each GDRD register 105 is coupled to one resource block 115, and is configured to disable the respective resource block 115 based on disable data received from the GDRD controller 110. For example, each resource block 115 has a dedicated GDRD register 105 that receives disable data from the GDRD controller 110 via the secure global interconnect 120. The dedicated GDRD register 105 stores the disable data from the GDRD controller 110 in a secure register that can only accessed by the GDRD controller 110 through the secure global interconnect 120. For example, the GDRD register 105 can store the disable data in triple-redundant self-healing flip-flops. In some cases, the GDRD registers 105 can include electronic fuses (e-fuses) that can permanently disable a resource block 115. For example, e-fuses in the GDRD registers 105 can permanently disconnect the resource block 115 from either the GDRD register 105 or from the secure global interconnect 120, and thus permanently disables the resource block. In some examples, the GDRD register 105 can include non-volatile memory for storing the disable data from the GDRD controller 110. Each GDRD register 105 comprises circuitry and/or logic for receiving and storing disable data for the resource block 115 to which the GDRD register 105 is connected and dedicated. Each GDRD register 105 also comprises circuitry and/or logic for disabling the resource block 115 to which the GDRD register 105 is connected and dedicated.

The GDRD controller 110, as mentioned, is configured to transmit the disable data to the GDRD register 105 dedicated to the resource block 115. In some examples, the GDRD controller 110 can generate disable data for the resource blocks to be disabled and can transmit the disable data to only GDRD registers 105 dedicated to the to-be-disabled resource blocks 115. The GDRD controller 110 can generate disable data for each resource block, and in some examples, the GDRD controller 110 can transmit the disable data to each resource block 115. The transmitted disable data can be tailored for the GDRD register 105 or the transmitted disable data can include disable/enable indications for each resource block 115. In some examples, the GDRD controller 110 can also assert a signal (e.g., GDRD_DONE signal) to each of the GDRD registers 105 to lock the GDRD registers 105 from outside access once the GDRD registers 105 have disabled the resource blocks 115 based on the disable data. The disable data may be transferred prior to the resource block being used, which may be indicated by the reset to the resource blocks 115 being released. Otherwise, the resource 115 may be disabled.

Securing the information indicating which resource blocks 115 are to be disabled is important to ensure that outside sources cannot override the disable information and prevent some resource blocks 115 from being disabled. In some examples, the GDRD controller 110 includes a memory that stores information regarding which resource blocks 115 are to be disabled. It must be noted that the disable data that is accessed by the GDRD controller may be stored from on-chip non-volatile storage that can be programmed once disallowing a disabled block from being enabled. Accordingly, storage can include e-fuses, which may be "blown" to signify a disabled block, and the GDRD controller 110 can read e-fuse information and transfer the information over the secure global interconnect 120 to the GDRD register 105.

The memory of the GDRD controller 110 can be flash memory with restricted access and configured to store the information regarding which resource blocks are to be disabled, and the GDRD controller 110 can generate the disable data to be sent to the GDRD registers 105 based on the information stored in the memory of the GDRD controller 110. The use of flash memory with restricted access in the GDRD controller 110 allows for ensuring that the resource blocks 115 to be disabled will be disabled and stay disabled. The permanence of storing the information regarding which resource blocks 115 are to be disabled in the memory of the GDRD controller 110 allows for permanently disabling the resource blocks 115 each time the device 100 is booted or powered on. In some examples, the GDRD controller 110 stores information that indicates which resources blocks 115 are to be enabled. Accordingly, in such examples, the GDRD controller 110 can transmit enable data to GDRD registers 105, so that GDRD registers 105 can enable their respective resource blocks 115 based on the transmitted enable data. By transmitting enable data, the GDRD infrastructure ensures that if data transmissions are somehow interrupted or prevented, the resource blocks 115 are not enabled and will not operate. In other words, the GDRD registers 105 receives transmitted enable data in order for the target resource block to be enabled. In some examples, a resource block 115 is disabled by default unless data from the GDRD controller 110 (stored in non-volatile memory and/or e-fuses) indicates that the resource block 115 is to be enabled. In the case of e-fuses, an e-fuse being "blown" indicates that the resource block 115 stays disabled, and thus preventing a disabled resource block from being re-enabled by "blowing" the e-fuse.

In some examples, other methods to secure the information regarding which resource blocks 115 are to be disabled can be implemented.

The resource blocks 115 are resources available to the device 100, such as digital-to-analog converters (DACs), analog-to-digital converters (ADCs), transceivers, memory, memory controllers, high-bandwidth memory interfaces, and inputs/outputs (I/O). Resource blocks 115 can also include CFRAME blocks on a fabric die, logic regions of a fabric die, and processing engines in different quadrants of an array of processing engines. In some examples, resource blocks 115 can include entire dies of a multi-die device. The device 100 can have any number of resources block 115 and the resource blocks are not limited to the examples provided herein. Each resource block 115 has functionalities and/or capabilities that can be disabled via the GDRD register 105. As illustrated in FIG. 1, resource block 115B includes Feature A, Feature B, and Feature C, and resource block 115C includes memory having a particular memory capacity. Some resource blocks 115 can include a combination of features and functionalities to be disabled. In some examples, the GDRD disable infrastructure is designed to incorporate each resource block 115 available on the device 100.

The secure global interconnect 120 is an interconnect disposed throughout the device 100, and in some examples, the secure global interconnect 120 allows access to each resource block 115 on the device 100. In one embodiment, the secure global interconnect 120 forms a ring around the device 100 in order to connect to or couple with each resource block 115 on the device 100.

In some examples, the device 100 can be a three-dimensional (3D) device comprising stacked dies. In such examples, the GDRD controller 110 can be disposed on a base die/IC or base substrate of the stacked dies, and the secure global interconnect 120 can be disposed throughout the other dies/ICs of the stacked dies of the 3D device. In a 3D device, some of the resource blocks 115 can be located on different dies, and accordingly, the dedicated GDRD registers 105 can be disposed on the same dies as the corresponding resource blocks 115. While FIG. 1 illustrates a device 100 having a single IC, in another embodiment a device can have multiple dies/ICs disposed on an interposer in a 2.5 dimensional configuration. For example, the device can have a first die and a second die, and the first and second dies can be disposed lateral to each other on an interposer. In such example, the secure global interconnect 120 can include local interconnects disposed in the dies, and GDRD registers 105 can be disposed in each of these dies.

Figure 2:
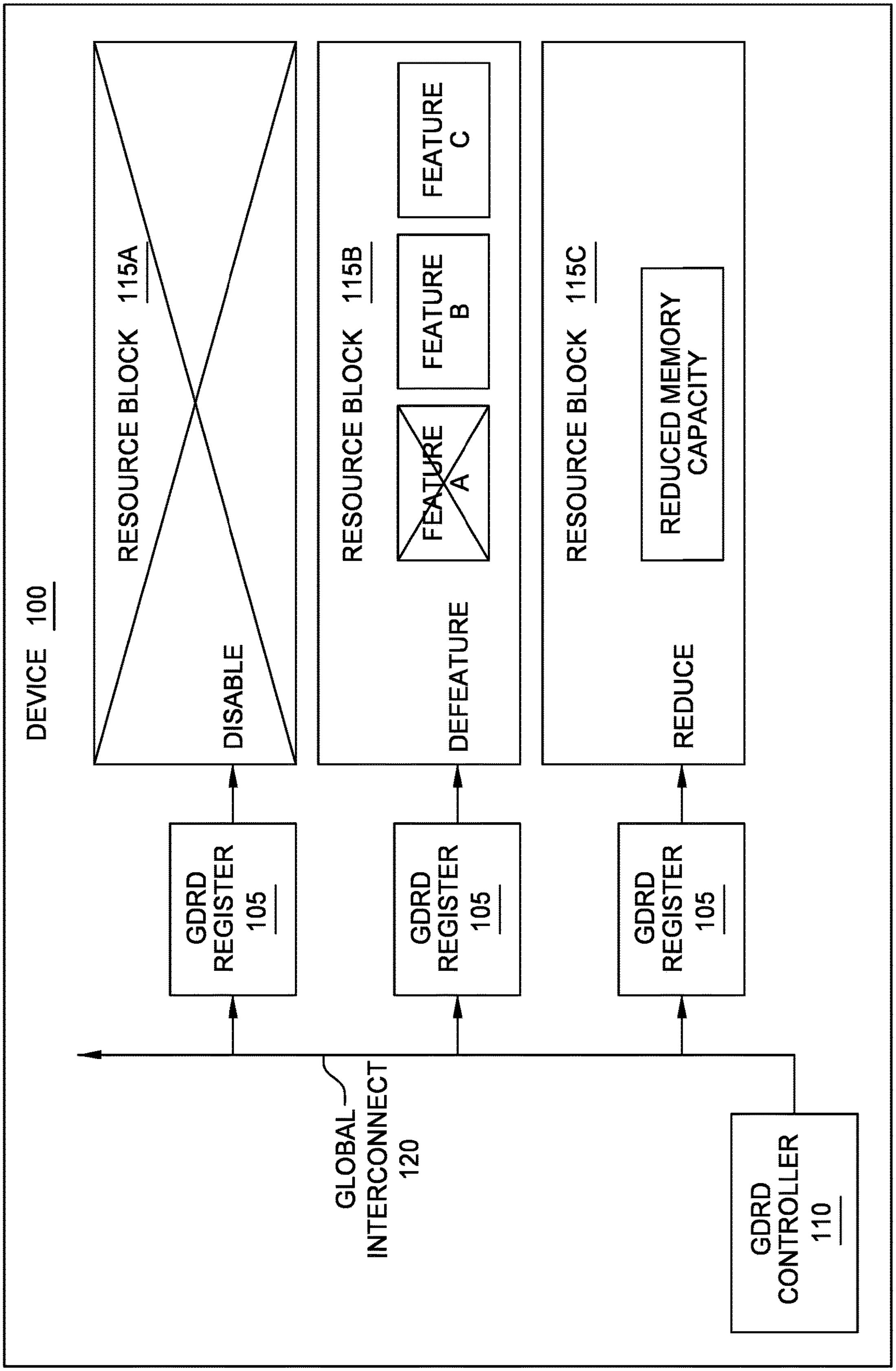
FIG. 2 illustrates the device disabling resources using a global device resource disable infrastructure, according to one example.

FIG. 2 is a block diagram of the device 100 of FIG. 1 having resources with disabled functionality and/or reduced capabilities, according to one example. During an initial boot phase of the device 100, the GDRD controller 110 transmits disable data to the GDRD registers 105 via the secure global interconnect 120.

The GDRD registers 105 use the disable data to disable or reduce at least some functionality of the resource blocks 115. In some examples, when the GDRD register 105 disables a resource block 115, the GDRD register 105 can completely disable a resource block 115 so that all functionality and/or capabilities of the resource block 115 cannot be used. For example, in FIG. 2, the GDRD register 105 completely disables the resource block 115A and so all features, functionality, and/or functionalities of the resource block 115A cannot be used. In some examples, when the GDRD register 105 disables a resource block 115, the GDRD register 105 can disable some features of the resource block 115 (called de-featuring) so that at least one feature cannot be used but other features of the resource block 115B can still be used. For example, in FIG. 2, the GDRD register 105 disables Feature A of the resource block 115B and leaves Feature B and Feature C enabled. In some examples, when the GDRD register 105 disable a resource block 115, the GDRD register 105 can reduce functionality of the resource block 115 (called reducing) so that while the functionality of the resource block 115C is still enabled, the functionality of the resource block 115 is reduced. For example, in FIG. 2, the GDRD register 105 reduces the functionality of the resource block 115C, so that the resource block 115C has a reduced memory capacity. In another example, if a resource block 115 could perform a maximum operational frequency, reducing the functionality of the resource block can mean that the resource block 115C operates at a lower operational frequency than the maximum operational frequency. While disabling, de-featuring, and reduction of functionality of resource blocks 115 is shown individually with resource blocks 115A-C, de-featuring and reduction of functionality of resource blocks 115 can occur simultaneously to a resource block 115.

As mentioned previously, the GDRD infrastructure provides a subset of the functionalities of the resource block 115 for, e.g., cost reduction or for limiting resources for export to countries that have government-imposed capability restrictions. The GDRD controller 110 can generate disable data based on information provided by the consumer or based on provided rules, or alternatively, the GDRD controller 110 can receive information for disabling resource blocks 115 and/or disable data. In some examples, the disabling, de-featuring, and/or reduction of functionalities can be included in the disable data.

In some examples, a disabled resource block can still be tested through scans for manufacturing, which eliminates the need to have different scan patterns depending on which resource blocks are enabled or disabled.

Figure 3:
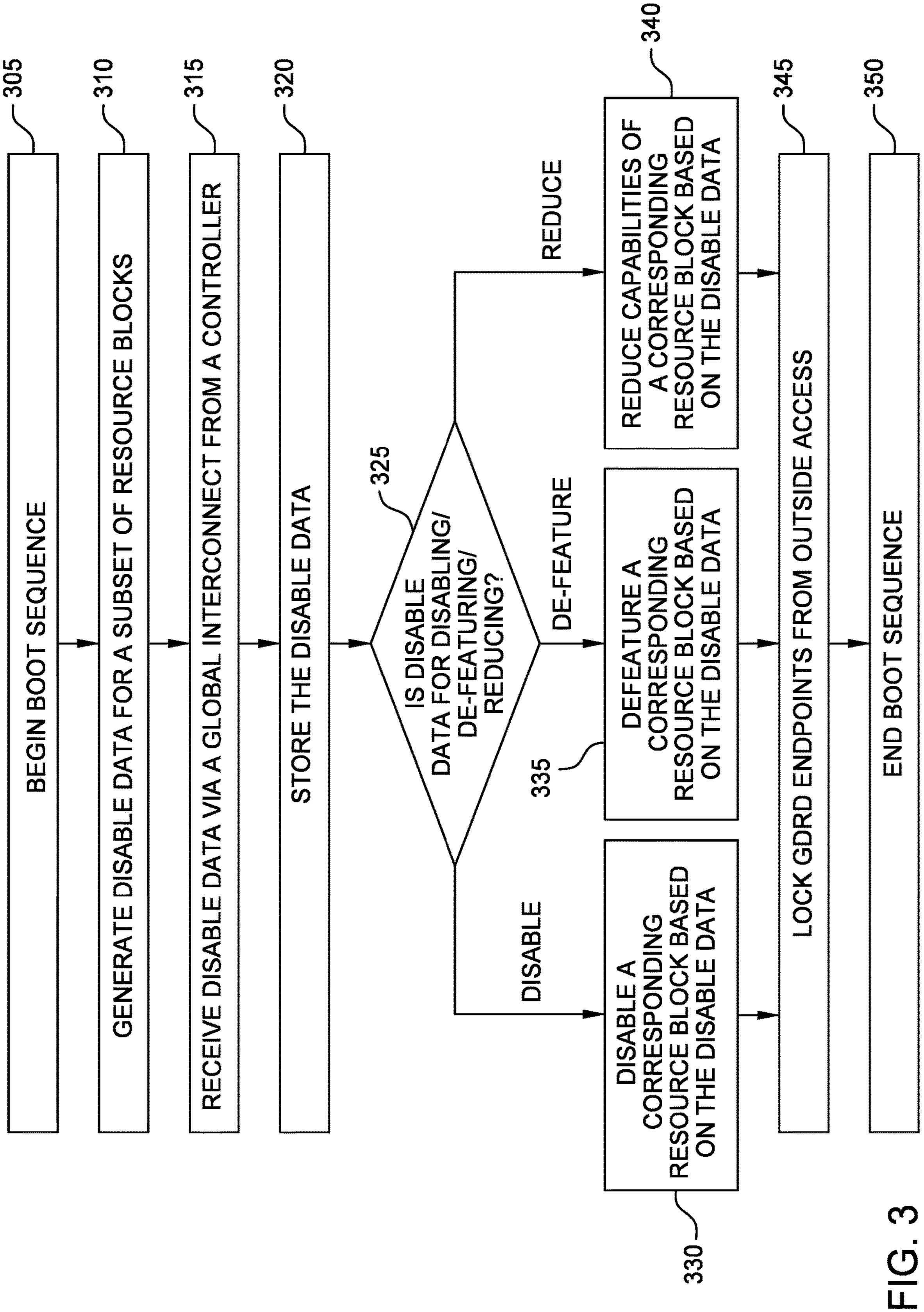
FIG. 3 is a flow chart illustrating operations by a global device resource disable infrastructure, according to one example.

FIG. 3 is a flow chart of operations by the GDRD infrastructure in the device 100 of FIG. 1, according to one example.

At 305, the device 100 begins the boot sequence. During the boot sequence, the device 100 may power up resource blocks 115 and also initialize components of the device 100, including the GDRD controller 110.

At 310, the device 100 generates disable data for a subset of resource blocks 115 of all the available resource blocks 115 of the device 100. In some examples, the device 100 generates disable data by having the GDRD controller 110 retrieve the disable data and/or information about disabling resource blocks 115 from memory coupled to (or within) the GDRD controller 110. In some examples, the disable data and/or information accessed by the GDRD controller comes from on-chip non-volatile storage that can be programmed once. For example, such storage includes e-fuses which can be "blown" to signify a disable block. The disable data and/or information is read directly by the GDRD controller 110 and transferred over the secure global interconnect to the GDRD register. In some examples, the device 100 does not generate the disable data but instead receives the disable data from memory coupled to the GDRD controller 110. As mentioned previously, the disable data can be customized for each GDRD register 105 and can include disable/enable indicators for the GDRD registers 105. For example, the GDRD registers 105 may be assigned unique IDs or addresses that the GDRD controller 110 can use to send customized data to the corresponding GDRD register 105.

At 315, the GDRD controller 110 transmits the disable data via a secure global interconnect 120 to the GDRD registers 105. Depending on the format of the disable data, transmission of the disable data can involve sending individually tailored messages to each of the GDRD registers 105 or sending messages about each GDRD register 105 to all GDRD registers 105. In the latter, the GDRD register 105 can identify which message is intended for them, and which messages are intended for another register 105. This could be done by providing IDs or addresses in the messages.

At 320, the device 100 stores the disable data in the GDRD registers 105. As mentioned above, the disable data, once sent from the GDRD controller 110, can be stored in secure registers in the GDRD registers 105, and the disable data is secured in the GDRD registers 105 in such a way that prevents the disable data from being tampered with by outside sources.

At 325, the device 100 determines whether the disable data is for disabling, de-featuring, or reducing functionalities of the respective resource block 115 coupled to each GDRD register 105. Depending on the information in the disable data, the device 100 can perform different actions for disabling at least some functionality of the resource blocks 115. As mentioned, in some examples, the disable data may indicate both de-featuring and reduction of functionalities of a resource block 115, and the device 100 can perform both operations of de-featuring at 335 and of reduction of functionality at 340.

At 330, if the disable data includes an indicator for disabling the resource block 115, the device 100 disables the resource block 115 based on the disable data, as illustrated with resource block 115A of FIG. 2. When the device 100 disables the resource block 115, the device 100 prevents any outside access of the resource block 115. In some examples, the device 100 can disrupt any connection to the resource block 115 by disconnecting the resource block 115 from the secure global interconnect 120.

At 335, if the disable data includes an indicator for de-featuring the resource block, the device 100 disables a feature of the resource block 115. As mentioned, when the device 100 disables a feature of the resource block 115, the device 100 disables the feature based on the disable data and can leave other features of the resource block 115 enabled, as illustrated with resource block 115B of FIG. 2.

At 340, if the disable data includes an indicator for reducing the functionalities of the resource block 115, the device 100 reduces the functionalities of the resource block 115 based on the disable data as illustrated with resource block 115C of FIG. 2. How much the device 100 reduces the functionalities of the resource block 115 can be indicated in the disable data. In some examples, how much the device 100 reduces the functionalities of the resource block may be stored in the GDRD register 105.

After the GDRD registers 105 either disable, de-feature, or reduce the functionalities of the resource block(s) 115, at 345, the device 100 locks each of the GDRD registers 105 from outside access. Locking the GDRD registers 105 from outside access can involve using combinational logic and a signal from the GDRD controller 110. For example, the GDRD register 105 can be locked to outside access after a GDRD_DONE signal from the GDRD controller 110 is asserted.

At 350, once the GDRD registers 105 are locked from outside access, the device 100 ends the boot sequence and proceeds with normal operation without the resources on the resource blocks 115 disabled during the boot sequence.

Figure 4:
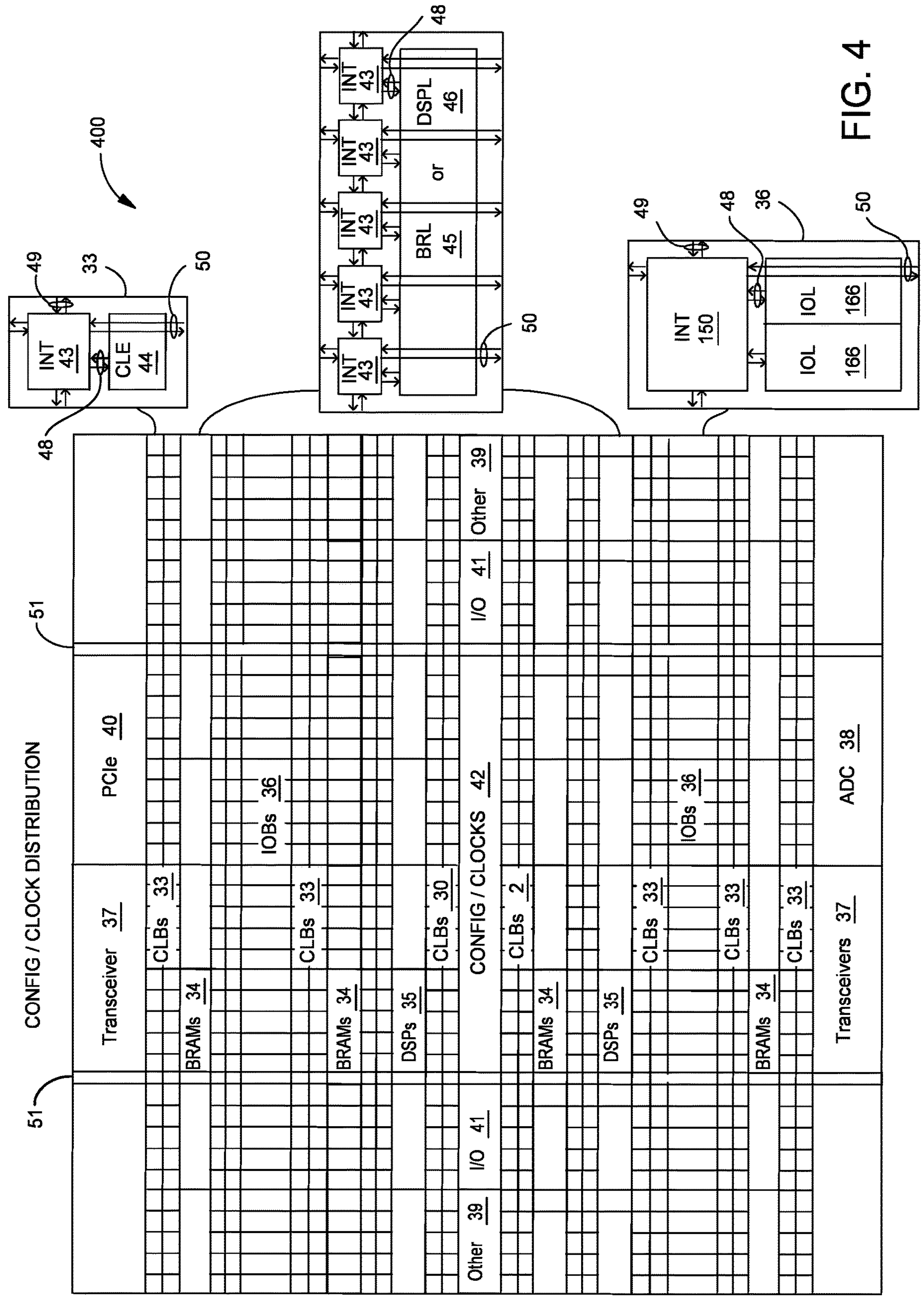
FIG. 4 illustrates a field programmable gate array (FPGA) that can incorporate the global device resource disable infrastructure, according to one example.

FIG. 4 illustrates an FPGA 400 implementation of an IC that can incorporate the GDRD disable infrastructure. The features and/or components of the FPGA 400 as described below can be included as resource blocks as described in FIG. 1.

In some examples, FPGA 400 includes a large number of different programmable tiles including transceivers 37, CLBs 33, BRAMs 34, input/output blocks ("IOBs") 36, configuration and clocking logic ("CONFIG/CLOCKS") 42, DSP blocks 35, specialized input/output blocks ("I/O") 41 (e.g., configuration ports and clock ports), and other programmable logic 39 such as digital clock managers, analog-to-digital converters, system monitoring logic, and so forth. The FPGA 400 can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 1. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 4) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 4 include additional logic blocks that disrupt the regular columnar structure making up a large part of the FPGA. The additional logic blocks can be programmable blocks and/or dedicated logic. Note that FIG. 4 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 4 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

The FPGA 400 can further include a configuration subsystem (e.g., a CFRAME subsystem) for configuring or programming the programmable tiles. In some examples, a CFRAME subsystem can receive configuration data for the programmable tiles of the FPGA 400 and can function as the configuration controller for configuring or programming the programmable tiles of the FPGA 400.

The above described FPGA is provided herein as an example of an IC to provide context to various methods described herein. Other types of ICs may be implemented in different methods.

The various examples described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more examples may be implemented as useful machine operations. In addition, one or more examples also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more examples may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium (e.g., a non-transitory storage medium) include a hard drive, a Solid State Disk (SSD), network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

While the foregoing is directed to specific examples, other and further examples may be devised without departing from the basic scope thereof, and the scope thereof is determined by the claims that follow.

What is claimed is:

1. A device, comprising:

a plurality of resource blocks, each resource block of the plurality of resource blocks including an active circuit subsystem;

a plurality of disable registers, each disable register of the plurality of disable registers coupled to a respective resource block of the plurality of resource blocks and each disable register of the plurality of disable registers is configured to permanently disable, in a selective manner, functionality of the respective resource block of the plurality of resource blocks based on received disable data;

a secure global interconnect coupled to a disable controller and to each of the plurality of disable registers; and the disable controller configured to transmit the disable data to the plurality of disable registers using the secure global interconnect, wherein the disable data is configured to indicate disabling, de-featuring, or reducing functionalities of the active circuit subsystem of each resource block of the plurality of resource blocks, wherein each disable register is configured to store the received disable data, wherein the secure global interconnect prevents alteration of the disable data by circuitry other than the disable controller, and wherein access to the secure global interconnect is restricted to the disable controller and the plurality of disable registers, wherein each of the plurality of disable registers is locked from outside access after the disable controller asserts a completion signal during an initial boot sequence of the device, wherein each disable register locally enforces the disabling, de-featuring, or reducing functionalities at the respective resource block based on the stored disable data.

2. The device of claim 1, wherein the disable controller is further configured to select which resource blocks of the plurality of resource blocks to apply the disabling, de-featuring, or reducing functionalities.

3. The device of claim 1, wherein the disable controller is configured to generate the disable data to disable, de-feature, or reduce functionalities of the one or more of the plurality of resource blocks.

4. The device of claim 1, wherein the active circuit subsystem is at least one of digital-to-analog converters (DACs), analog-to-digital converters (ADCs), transceivers, memory, memory controllers, high-bandwidth memory interfaces, inputs/outputs (I/O), logic regions, and processing engines.

5. The device of claim 1, wherein the disable controller is disposed on a substrate of a base die.

6. The device of claim 1, where the one or more resource blocks are implemented on one or more integrated circuits.

7. The device of claim 6, wherein the secure global interconnect is disposed through each of the one or more integrated circuits and the one or more integrated circuits comprise multiple dies.

8. The device of claim 6, wherein each of the one or more integrated circuits comprises a local interconnect coupled to the secure global interconnect.

9. The device of claim 1, wherein each of the disable registers comprises electronic fuses that permanently disable the functionality of the respective resource block.

10. The device of claim 9, wherein the disable controller reads information related to the electronic fuses and transfers the information to the respective resource block.

11. The device of claim 10, wherein the disable controller is configured to transmit the information related to the electronic fuses during the initial boot sequence of the device.

12. The device of claim 1, wherein the disable controller is configured to transmit disable data to each of a subset of the plurality of disable registers, wherein each of the subset of the plurality of disable registers is coupled to a corresponding resource block to be disabled.

13. The device of claim 1, wherein each disable register is configured to disable functionality of the respective resource block based on received disable data and to keep remaining functionality of the respective resource block enabled.

14. The device of claim 1, wherein at least one of the plurality of resource blocks is disposed on a separate substrate from the disable controller.

15. The device of claim 1, wherein each of the plurality of disable registers comprises tamper-resistant storage configured to maintain the stored disable data.

16. The device of claim 1, wherein the disable controller is configured to transmit the disable data as one or more messages including an identifier corresponding to a particular disable register, and wherein each disable register is configured to accept only disable data corresponding to the identifier of the disable register.

17. A method by a device, the method comprising:

receiving, by a plurality of disable registers of the device, from a disable controller of the device, electronic fuse information for permanently disabling, in a selective manner, a subset of a plurality of resource blocks coupled to a respective subset of the plurality of disable registers, each resource block of the plurality of resource blocks including an active circuit subsystem;

receiving the electronic fuse information via a secure global interconnect coupled to each of the plurality of disable registers, wherein the secure global interconnect prevents alteration of the electronic fuse information by circuitry other than the disable controller, and wherein access to the secure global interconnect is restricted to the disable controller and the plurality of disable registers;

permanently disabling, in the selective manner, by the respective subset of the plurality of disable registers, functionality of the subset of the plurality of resource blocks based on the electronic fuse information, wherein each of the respective subset of the plurality of disable registers is configured to store the electronic fuse information; and locking the plurality of disable registers from outside access after the disable controller asserts a completion signal during an initial boot sequence of the device, wherein the electronic fuse information is configured to provide disabling, de-featuring, or reducing functionalities of the active circuit subsystem of each resource block of the plurality of resource blocks, and wherein each disable register locally enforces the disabling, de-featuring, or reducing functionalities at the respective resource block based on the stored electronic fuse information.

18. The method of claim 17, further comprising:

storing the electronic fuse information in a tamper-resistant storage of a disable register of the plurality of disable registers.

19. The method of claim 18, further comprising:

locking the plurality of disable registers from outside access such that the electronic fuse information is not writeable after the initial boot sequence of the device.

20. The method of claim 17, wherein disabling the functionality of the subset of resource blocks of the plurality of resource blocks comprises:

disabling the respective resource block of the plurality of resource blocks;

de-featuring at least one feature of the respective resource block of the plurality of resource blocks; or reducing the functionality of the respective resource block of the plurality of resource blocks.

* * * * *